(12) United States Patent
Nammi

(10) Patent No.: US 10,237,025 B2
(45) Date of Patent: Mar. 19, 2019

(54) DETECTING DATA IN MULTIANTENNA WIRELESS COMMUNICATION SYSTEMS

(71) Applicant: AT&T INTELLECTUAL PROPERTY I, L.P., Atlanta, GA (US)

(72) Inventor: SaiRamesh Nammi, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 23 days.

(21) Appl. No.: 15/423,944

(22) Filed: Feb. 3, 2017

(65) Prior Publication Data

US 2018/0227091 A1 Aug. 9, 2018

(51) Int. Cl.
| | |
|---|---|
| H04L 1/24 | (2006.01) |
| H04L 1/00 | (2006.01) |
| H04W 24/02 | (2009.01) |
| H04L 5/00 | (2006.01) |
| H04L 25/08 | (2006.01) |
| H04B 7/0413 | (2017.01) |

(52) U.S. Cl.
CPC .......... *H04L 1/245* (2013.01); *H04L 1/0063* (2013.01); *H04L 5/0055* (2013.01); *H04L 25/08* (2013.01); *H04W 24/02* (2013.01); *H04B 7/0413* (2013.01)

(58) Field of Classification Search
CPC ........... H04L 2025/03426; H04L 1/005; H04L 1/0054; H04L 25/03171; H04L 25/03242; H04B 7/0413; H04N 21/2383; H04N 21/4382
See application file for complete search history.

(56) References Cited

U.S. PATENT DOCUMENTS

| | | | |
|---|---|---|---|
| 8,023,581 | B2 | 9/2011 | Kim et al. |
| 8,184,750 | B2 | 5/2012 | Mundarath et al. |
| 8,537,924 | B2 | 9/2013 | Jongren et al. |
| 8,588,319 | B2 | 11/2013 | Malladi et al. |
| 8,798,201 | B2 | 8/2014 | Kim |
| 8,798,551 | B2 | 8/2014 | Yuan et al. |
| 9,019,845 | B2 | 4/2015 | Prakash et al. |
| 9,148,256 | B2 | 9/2015 | Sampath et al. |
| 9,197,461 | B1 | 11/2015 | Sun et al. |
| 9,264,118 | B1 | 2/2016 | Koike-Akino et al. |

(Continued)

OTHER PUBLICATIONS

Biglieri, et al. "MIMO Doubly-iterative receivers: Pre-vs. post-cancellation filtering." IEEE Communications Letters 9.2 (2005): 106-108.

*Primary Examiner* — Marsha D Banks Harold
*Assistant Examiner* — Elton Williams
(74) *Attorney, Agent, or Firm* — Amin, Turocy & Watson, LLP

(57) ABSTRACT

A multiple-input multiple output (MIMO) wireless receiver is provided to detect data in MIMO streams received via a multi-antenna system. A filter based detector performs a first pass at decoding codewords in a MIMO bitstream, and then a parity check is performed to determine that the codewords were decoded correctly. If one or more codewords are decoded correctly, those codewords can be used as a candidate codeword and used to generate a bit log likelihood ratio as an input for a second MIMO detector pass which uses a list based MIMO detector. The first pass with a high speed, simple detector facilitates decreasing the list size for the second, optimum list based detector which helps improve overall throughput.

20 Claims, 10 Drawing Sheets

(56) References Cited

U.S. PATENT DOCUMENTS

| | | | |
|---|---|---|---|
| 2007/0116143 A1* | 5/2007 | Bjerke | H04L 1/005 375/262 |
| 2010/0229065 A1 | 9/2010 | Yuda et al. | |
| 2010/0246732 A1* | 9/2010 | Seo | H04B 7/0857 375/341 |
| 2011/0051858 A1* | 3/2011 | Salvekar | H04B 1/7107 375/341 |
| 2011/0075752 A1 | 3/2011 | Zheng et al. | |
| 2016/0065274 A1 | 3/2016 | Kim et al. | |

* cited by examiner

| Configuration | Sector Throughput (Mbps) | | Cell edge Throughput (Kbps) | | % gain of Proposed detector with respect to MMSE | |
|---|---|---|---|---|---|---|
| | MMSE | Proposed detector | MMSE | Proposed detector | Sector Throughput | Cell edge Throughput |
| 2x2 | 14.55 | 18.05 | 329 | 338 | 24.05 | 2.75 |
| 4x4 | 20.46 | 26.52 | 242 | 375 | 29.62 | 54.96 |

FIG. 5

DETECTING DATA IN MULTIANTENNA WIRELESS COMMUNICATION SYSTEMS

TECHNICAL FIELD

The disclosed subject matter relates to detecting data in multiantenna wireless communications systems to enable improvement of wireless system performance over conventional wireless system technologies, e.g., for fifth generation (5G) technologies or other next generation networks.

BACKGROUND

To meet the huge demand for data centric applications, third generation partnership project (3GPP) systems and systems that employ one or more aspects of the specifications of fourth generation (4G) standards for wireless communications will be extended to fifth generation (5G) standards for wireless communications. Unique challenges exist to provide levels of service associated with forthcoming 5G and/or other next generation standards for wireless networks.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 5 illustrates an example table showing improvements to throughput using the MIMO wireless receiver in accordance with various aspects and embodiments of the subject disclosure.

DETAILED DESCRIPTION

Figure 1:
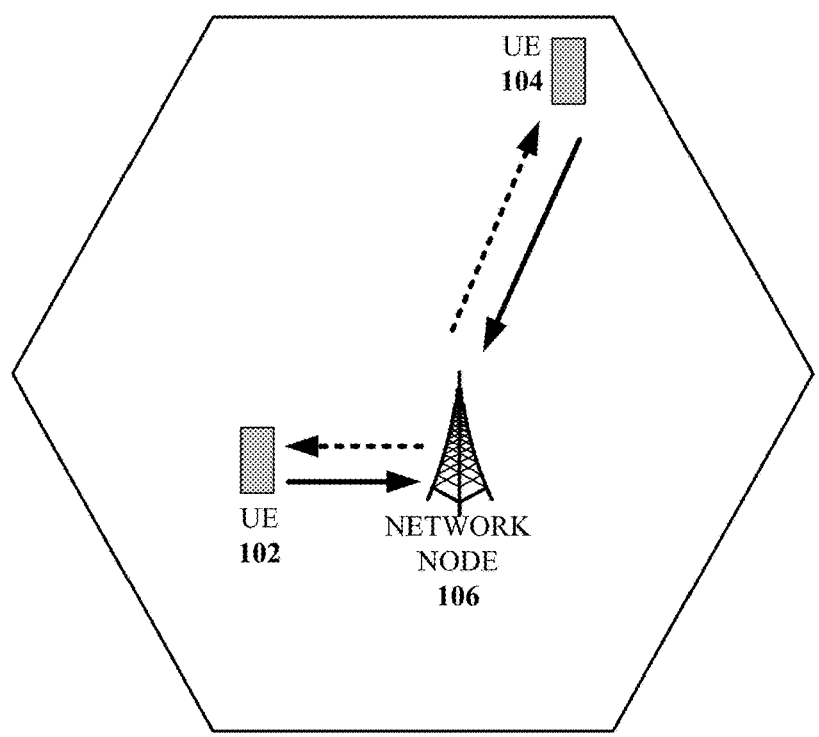
FIG. 1 illustrates an example block diagram of a wireless communication system that detects data in multiantenna transmission in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

A multiple-input multiple output (MIMO) wireless receiver is provided to detect data in MIMO streams received via a multi-antenna system. A filter based detector performs a first pass at decoding codewords in a MIMO bitstream, and then a parity check is performed to determine that the codewords were decoded correctly. If one or more codewords are decoded correctly, those codewords can be used as a candidate codeword and used to generate a bit log likelihood ratio as an input for a second MIMO detector pass which uses a list based MIMO detector. The first pass with a high speed, simple detector facilitates decreasing the list size for the second, optimum list based detector which helps improve overall throughput.

To at least these and related ends, a system can comprise a processor and a memory that stores executable instructions that, when executed by the processor, facilitate performance of operations, including receiving a bitstream comprising multiplexed codewords, wherein the bitstream is subject to an inter-stream interference. The operations can also comprise performing a first pass with respect to the bitstream to reduce the inter-stream interference using a first multiple-input multiple-output detector. The operations can also comprise in response to performing the first pass, determining that a first codeword of the multiplexed codewords passed a parity check and a second codeword of the multiplexed codewords did not pass the parity check. The operations can also comprise performing a second pass with respect to the bitstream to further reduce the inter-stream interference using a second multiple-input multiple-output detector different from the first multiple-input multiple-output detector, wherein an output of the first pass is used as a input for the second pass.

In another embodiment, a method can comprise receiving, by a device comprising a processor, a bitstream comprising multiplexed codewords. The method can also comprise performing, by the device, a first decoding pass with a first multiple-input multiple-output detector. The method can also comprise determining, by the device, that a first codeword passes a parity check and a second codeword does not pass the parity check. The method can also comprise performing, by the device, a second decoding pass with a second multiple-input multiple-output detector, wherein the first codeword of the first decoding pass is used as a candidate codeword for the second decoding pass.

In another embodiment, a machine-readable storage medium, comprising executable instructions that, when executed by a processor of a device, facilitate performance of operations. The operations can comprise receiving a signal from a multiple-input multiple-output antenna, the signal comprising multiplexed codewords. The operations can also comprise performing a first decoding pass on the multiplexed codewords with a first multiple-input multiple-output detector. The operations can also comprise determining that a first codeword passes a parity check and a second codeword does not pass the parity check. The operations can also comprise generating a bit log-likelihood ratio from an output of the first decoding pass and performing a second decoding pass with a second multiple-input multiple-output detector to decode the second codeword, wherein the bit log-likelihood ratio is used to facilitate the second decoding pass.

MIMO is an advanced antenna technique that improves the spectral efficiency of a transmission and thereby boosts the overall system capacity. The MIMO technique uses a commonly known notation (M×N) to represent MIMO configuration in terms number of transmit (M) and receive antennas (N). Multiple transmit and receive antennas can significantly increase the data carrying capacity of wireless systems, but MIMO detector which identify and decode the multiplexed codewords have several tradeoffs. There are a group of MIMO detectors that are simple, and easy to implement, but their bit error rate or frame error rate performance is significantly inferior to that of an optimal MIMO detector. This first group of MIMO detectors can be filter based detectors such as Linear detectors include zero-forcing (ZF) and minimum mean-square error (MMSE) detectors, and the nonlinear receivers include decision feedback, nulling-canceling and variants relying on successive interference cancelation.

Optimum, or near optimal detectors, such as list-based detectors, maximum likelihood detector, maximum a posteriori probability detector, (ML/MAP) sphere decoding detector, or list sphere decoding detector, have significantly better bit error rates and frame error rates, but the complexity of the detector increases exponentially with the number of transmit antennas and/or the number of bits per constellation point.

In an embodiment, by first performing a decoding pass using one of the filter based MIMO detectors, if one or more of the codewords of the multiplexed codewords bitstream is correctly decoded, then the list size for the list based MIMO detectors can be reduced, which allows the codewords that were previously undetected, or improperly decoded after the first pass to be decoded properly during the second pass with the list based detector. Since the list size has been reduced, the complexity of the second pass is also correspondingly reduced, and throughput of the MIMO receiver can be improved. This technique can be faster than the traditional technique of sending negative acknowledgements and receiving retransmissions.

Turning now to FIG. 1, illustrated is an example block diagram of a wireless communication system 100 that detects data in multiantenna transmission in accordance with various aspects and embodiments of the subject disclosure. In one or more embodiments, system 100 can comprise one or more user equipment UEs 104 and 102, which can have one or more antenna panels having vertical and horizontal elements. A UE 102 can be a mobile device such as a cellular phone, a smartphone, a tablet computer, a wearable device, a virtual reality (VR) device, a heads-up display (HUD) device, a smart car, a machine-type communication (MTC) device, and the like. User equipment UE 102 can also comprise IOT devices that communicate wirelessly. In various embodiments, system 100 is or comprises a wireless communication network serviced by one or more wireless communication network providers. In example embodiments, a UE 102 can be communicatively coupled to the wireless communication network via a network node or base station device 106.

The non-limiting term network node (or radio network node) is used herein to refer to any type of network node serving a UE 102 and UE 104 and/or connected to other network node, network element, or another network node from which the UE 102 or 104 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 106) can comprise but are not limited to: NodeB devices, base station (BS) devices, access point (AP) devices, and radio access network (RAN) devices. The network node 106 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 106 can be referred to as a gNodeB device.

In example embodiments, the UE 102 and 104 can send and/or receive communication data via a wireless link to the network node 106. The dashed arrow lines from the network node 106 to the UE 102 and 104 represent downlink (DL) communications and the solid arrow lines from the UE 102 and 104 to the network nodes 106 represents an uplink (UL) communication.

Wireless communication system 100 can employ various cellular technologies and modulation schemes to facilitate wireless radio communications between devices (e.g., the UE 102 and 104 and the network node 106). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UEs 102 and 104 and the network device 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

In various embodiments, the network node 106 and UE 104 and 102 can employ MIMO techniques to improve spectral efficiency of transmissions sent between the devices. MIMO can multiply the capacity of the radio links by using multiple transmit and receive antennas to exploit multipath propagation. A multiantenna receiver on either one of the UEs 102 or 104 or on the network node 106 can receive a transmission that comprises a bitstream comprising multiplexed codewords. A MIMO detector can be utilized to detect the codewords in the bitstream, and then a decoder can decode the codewords.

Please note that, although the disclosure generally refers to a MIMO system as a single user MIMO with multiple codewords. However this invention is equally applicable to multi user MIMO with single or more transmit antennas. The invention is applicable to both downlink and uplink transmissions. The embodiments are described in particular for operation of NR, E-UTRA/LTE/LTE-A, UTRA/HSPA FDD systems. The embodiments are however applicable to any RAT or multi-RAT system where the UE operates using MIMO e.g. LTE TDD, GSM/GERAN, Wi Fi, WLAN, WiMax, CDMA2000, LTE-NX, Massive MIMO systems etc.

In an embodiment, the MIMO detector can first performing a decoding pass using one of the filter based MIMO detectors and if one or more of the codewords of the multiplexed codewords bitstream is correctly decoded, then the list size for the list based MIMO detectors can be reduced, which allows the codewords that were previously undetected, or improperly decoded after the first pass to be decoded properly during the second pass with the list based detector. Since the list size has been reduced, the complexity of the second pass is also correspondingly reduced, and throughput of the MIMO receiver can be improved. This technique can be faster than the traditional technique of sending negative acknowledgements and receiving retransmissions.

In an embodiment, a filter based MIMO detector, (zero forcing detector, minimum mean-square error detector, decision feedback detector, nulling-canceling detector, or successive interference cancelation detector) is used to perform a first pass on a set of 4 codewords. The first two decoded codewords pass a parity check (e.g., a cyclic redundancy check) while the second two codewords do not pass. Instead of sending a NAK immediately back to the transmitter to retransmit, a list based MIMO detector can perform a second pass and use the filter based detector (maximum likelihood detector, maximum a posteriori probability detector, sphere decoding detector, or list sphere decoding detector) output for the first and $2^{nd}$ codewords in the list size. (i.e. instead of checking all the combinations for the $1^{st}$ and $2^{nd}$ codeword, we use the candidate codeword from the filter based detector output). The main reason is since the codewords are already passed this means that the filter based output is good enough. Hence these codewords are used as the candidate codeword in the ML/MAP metric for generating the bit likelihood ratios at the list based detector output. i.e the complexity of the list based detector is reduced by 2 times as the list size is half of the conventional list based detector algorithm.

Figure 2:
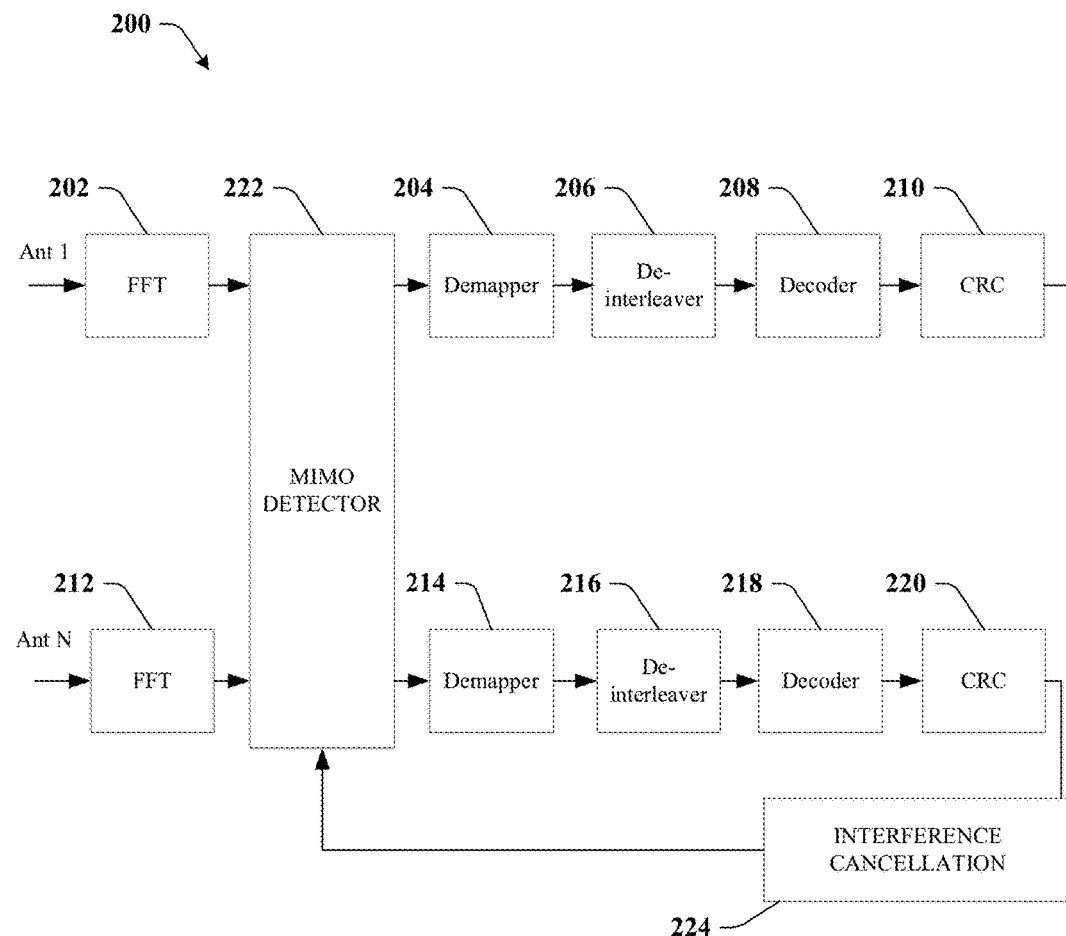
FIG. 2 illustrates an example block diagram of a multiple-input multiple output (MIMO) wireless receiver that facilitates detecting data in multi-antenna wireless systems in accordance with various aspects and embodiments of the subject disclosure.

Turning now to FIG. 2, illustrated is an example block diagram of a multiple-input multiple output (MIMO) wireless receiver 200 that facilitates detecting data in multi-antenna wireless systems in accordance with various aspects and embodiments of the subject disclosure.

A wireless receiver 200 can include Fast Fourier Transform (FFT) blocks 202 and 212 that receive transmissions received at respective antennas (Ant 1 to Ant N). The respective transmissions or bitstreams can each include an Orthogonal Frequency Division Multiplexed (OFDM) codeword that received an N QAM symbol from the MIMO encoder at the transmitter. The transmitter's inverse FFT blocks can convert the N symbols to the OFDM symbols in the time domain, and then the FFT blocks 202 and 212 can convert the OFDM symbols back to the frequency domain.

A MIMO detector 222 can then perform a first pass with a filter based detector to detect/decode one or more of the codewords received from the Ant N antennas, and then demappers 204 and 214 and deinterleavers 206 and 216 can then take the respective code words and demap and deinterleave them. The bitstreams, once deinterleaved can be decoded by decoders 208 and 218, and if the MIMO detector 222 during the first pass correctly detected the codewords, CRC components 210 and 220 can perform parity checks using CRC bits in the decoded codewords. If the CRC components 210 and 220 determine that one or more of the codewords have been correctly decoded, then the interference cancelation block 224 can take the correctly decoded codewords as candidate codewords, and calculate bit log-likelihood ratios that can be used as input for a second pass with the MIMO detector 222 that uses a list based detection method.

The list based detection method can comprise at least one of a maximum likelihood detector, a maximum a posteriori probability detector, a (ML/MAP) sphere decoding detector, or list sphere decoding detector, which have significantly better bit error rates and frame error rates than the filter based detectors, but where the complexity of the detector increases exponentially with the number of transmit antennas and/or the number of bits per constellation point. By using the input of the correctly decoded codewords and bit log-likelihood ratios, the list size can be reduced for the second pass, and the complexity decreased. MIMO detector 222 can then decode one or more of the rest of the codewords. If the CRC components 210 and/or 220 determine that there are still incorrectly decoded codewords, then the process can repeat with either the filter based detector or list based detector until the codewords are correctly decoded, or until a certain number of iterations have passed. If the predefined number of iterations passes, a negative acknowledgement (NAK) can be sent back to the transmitter to resend the transmission.

Figure 3:
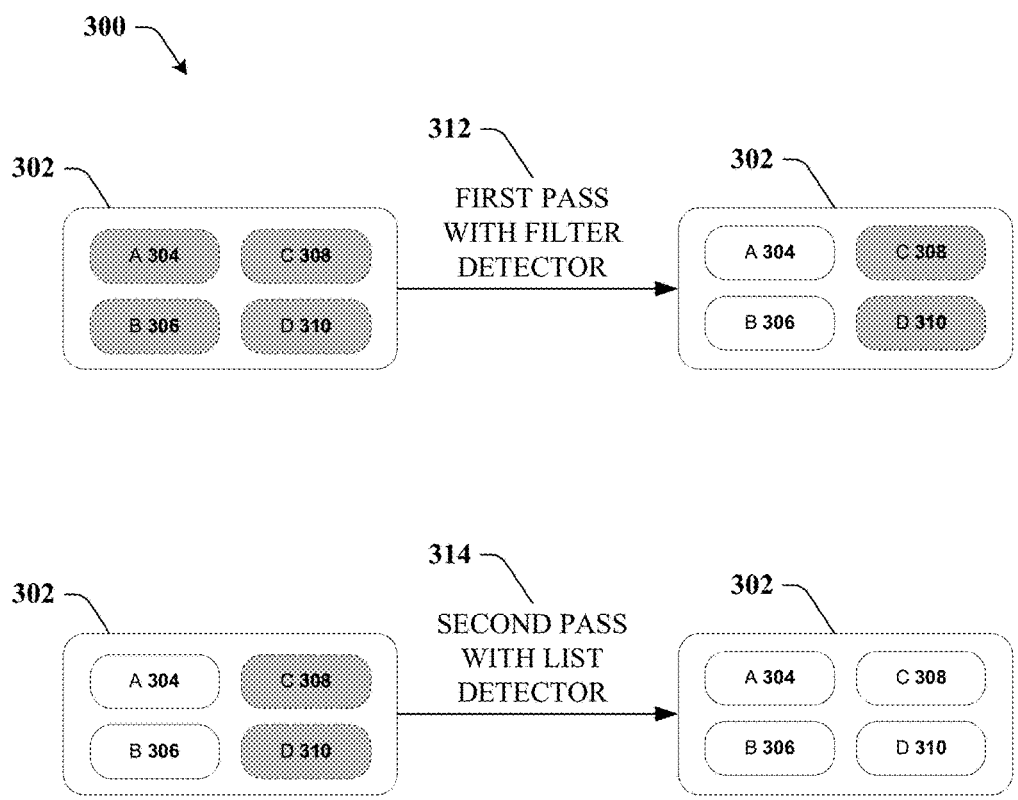
FIG. 3 illustrates an example block diagram of a MIMO bitstream that has two decoding passes performed in accordance with various aspects and embodiments of the subject disclosure.

Turning now to FIG. 3, illustrated is an example block diagram 300 of a MIMO bitstream that has two decoding passes performed in accordance with various aspects and embodiments of the subject disclosure. Bitstream 302 can include a set of multiplexed codewords A 304, B 306, C 308, and D 310. Before the first pass 312 with the filter detector, all four greyed out codewords are unknown. After the first pass 312 with the filter detector (e.g., a zero forcing detector, a minimum mean-square error detector, a decision feedback detector, a nulling-canceling detector, or a successive interference cancelation detector) codewords A 304 and B 306 can be known after a CRC check determines that they were properly decoded, while codewords C 308 and D 310 remain unknown.

During the second pass with a list based detector (e.g., a maximum likelihood detector, a maximum a posteriori probability detector, a (MUMAP) sphere decoding detector, or list sphere decoding detector), the list based detector does not have to go through all the combinations on the lists for codewords A 304 and B 306 since they are already known. The resulting decrease in complexity can allow the second pass 314 to be performed more quickly than if the first pass 312 had not been performed, and overall throughput can be increased.

Figure 4:
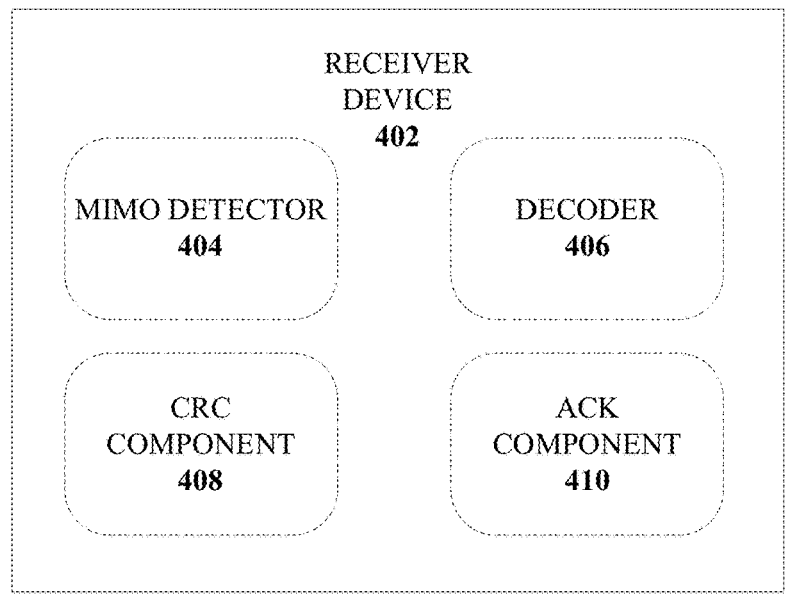
FIG. 4 illustrates an example block diagram showing a MIMO wireless receiver device in accordance with various aspects and embodiments of the subject disclosure.

Turning now to FIG. 4, illustrated is an example block diagram 400 showing a MIMO wireless receiver device 402 in accordance with various aspects and embodiments of the subject disclosure.

The MIMO wireless receiver device 402 can receive at multiple antennas, a transmission from a MIMO transmitter. The resultant bitstreams can be analyzed by a MIMO detector 404 to detect one more codewords in the bitstream. The bitstream can comprise a set of multiplexed codewords, wherein the number of multiplexed codewords is based on the number of antennas. In some embodiments there can be 4 antennas, in others 8 antennas, and in yet other 16 or more antennas. The MIMO detector 404 can perform a first pass with respect to the bitstream to reduce the inter-stream interference using a first multiple-input multiple-output detector. The first detector pass can use a filter based detection techniques such as zero forcing, minimum mean-square error, decision feedback, nulling-canceling, or successive interference cancelation. The decoder 406 can then decode the detected codewords based on the particular encoding method, and CRC component 408 can check the parity bits of the decoded codewords to see if the codewords were detected/decoded properly.

If one or more of the codewords were detected/decoded properly, the output of the MIMO detector 404 in the first pass can be used as an input in the second pass, which further reduces the inter-stream interference. The second pass can use list based detection which can comprise at least one of a maximum likelihood detector, maximum a posteriori probability detector, sphere decoding detector, or list sphere decoding detector.

If all the codewords are not detected after the second pass, the MIMO detector 404 can iteratively reperform the first pass and the second pass until all codewords of the multiplexed codewords are correctly decoded or until a predefined number of iterations has passed. An ACK component 410 can transmit a negative acknowledgement to a transmitter in response to not decoding all the multiplexed codewords after the predefined number of iterations has passed. The ACK component 410 can also transmit an acknowledgement to a transmitter in response to decoding all the multiplexed codewords.

Turning now to FIG. 5, illustrated is an example table 500 showing improvements to throughput using the MIMO wireless receiver in accordance with various aspects and embodiments of the subject disclosure Results of improvements can be shown for both configurations 502 of exemplary embodiments of 2×2 and 4×4 MIMO antennas. Sector throughput 504 in Mbps can be compared for just MMSE detectors and the disclosed detector in both 2×2 and 4×4 configurations. Sector throughput using and MMSE is 14.55 Mbps and 20.46 in 2×2 and 4×4 configuration respectively, but using the disclosed detector, the throughput is 18.05 and 26.52 respectively.

Cell edge throughput 506 for an MMSE detector is 329 Kbps and 242 Kbps for 2×2 and 4×4 antennas respectively, while for the proposed detector it is 338 Kbps and 375 Kbps respectively.

The percent gain of proposed detector with respect to MMSE in sector throughput is 24.05% and 29.62% for 2×2 and 4×4 respectively, while for Cell Edge throughput percent gain is 2.75% and 54.96% respectively.

Figure 6:
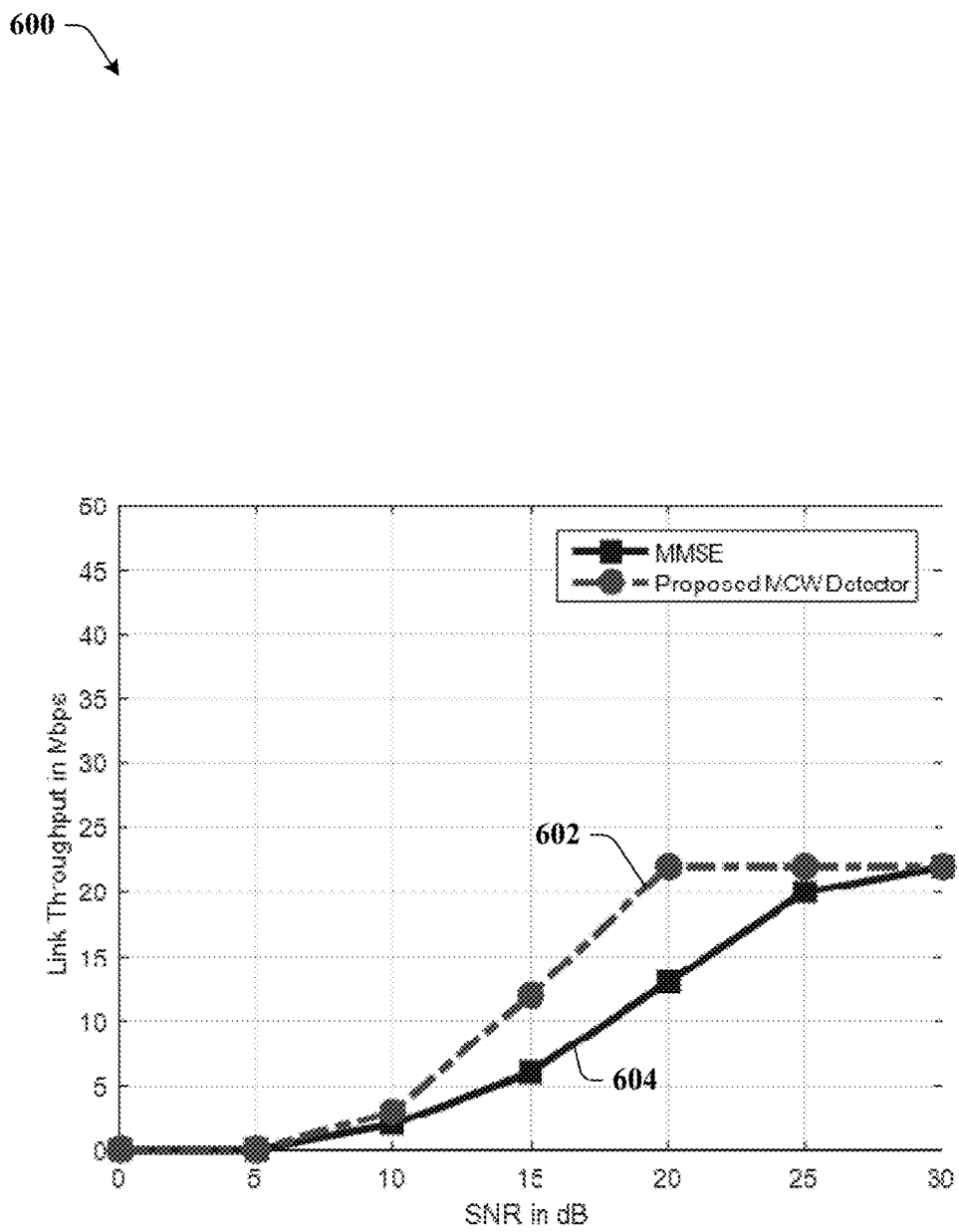
FIG. 6 illustrates an example graph showing improvements in link throughput using the MIMO wireless receiver in accordance with various aspects and embodiments of the subject disclosure.

A graph showing this relationship can be found in FIG. 6 where the MMSE Link throughput in Mbps for every dB in SNR is shown by 604, whereas the improvement is clear for the proposed detector 602, especially in mid range SNR.

Figure 7:
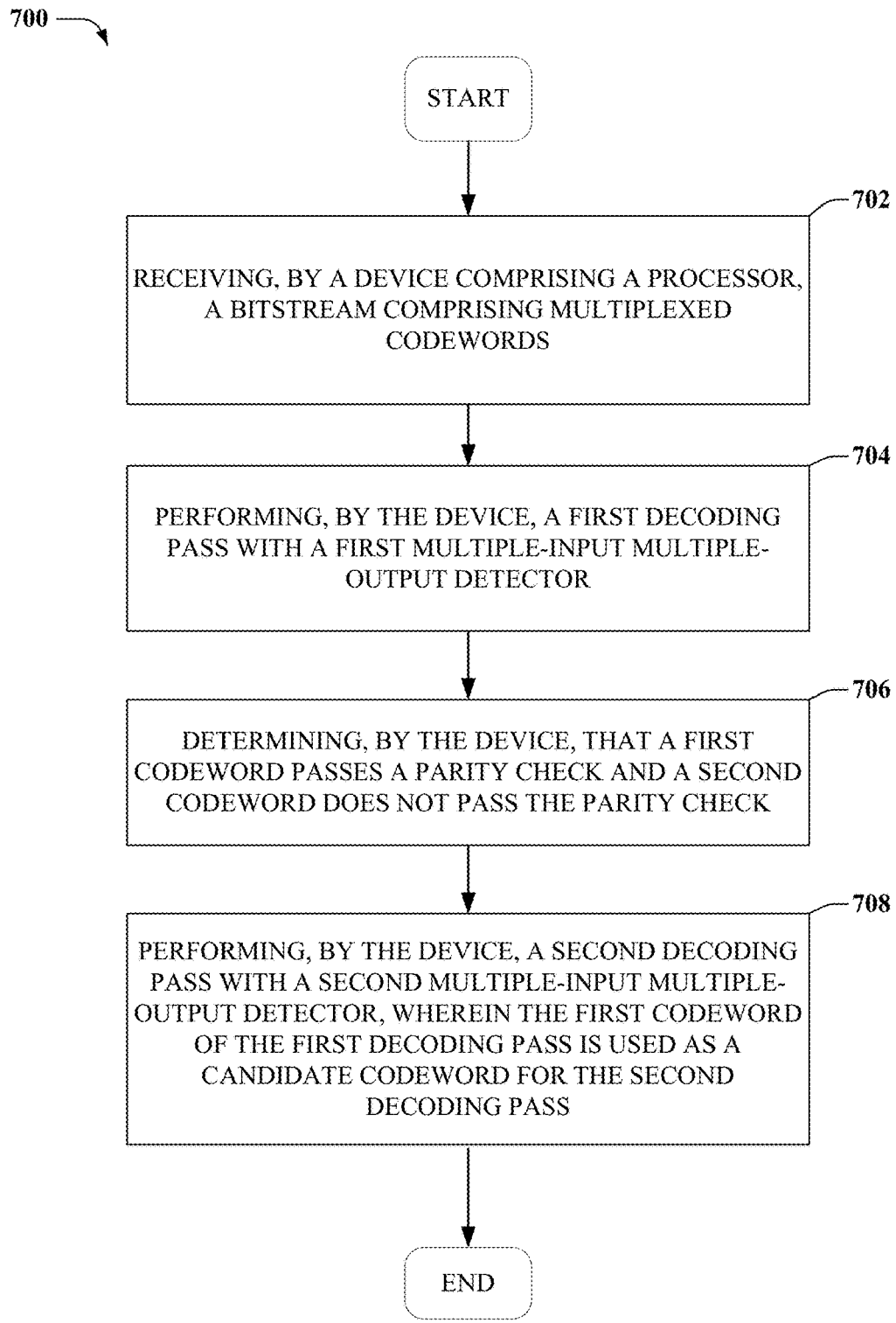
FIG. 7 illustrates an example method for detecting data in MIMO wireless receivers in accordance with various aspects and embodiments of the subject disclosure.
Figure 8:
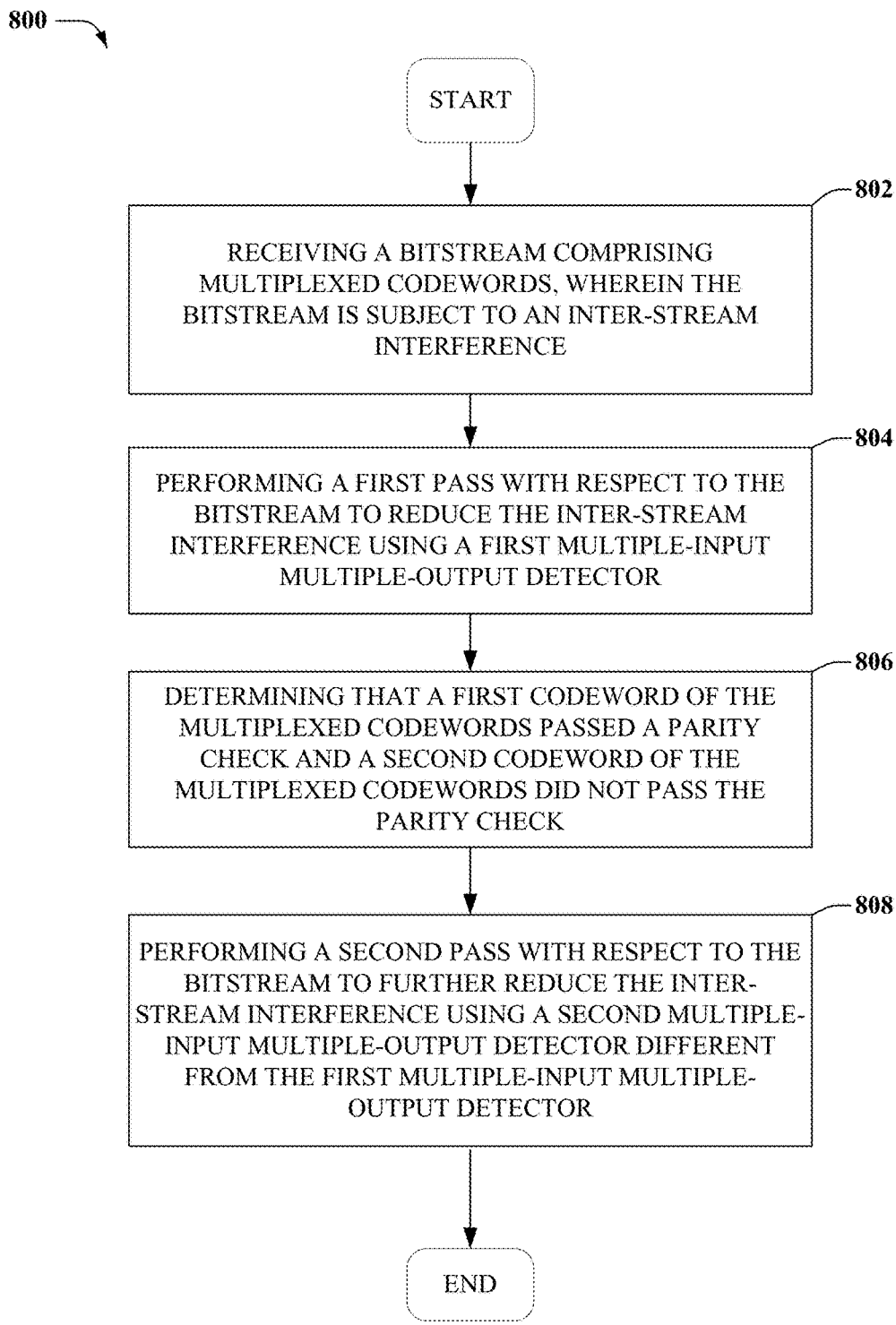
FIG. 8 illustrates an example method for detecting data in MIMO wireless receivers in accordance with various aspects and embodiments of the subject disclosure.

FIGS. 7-8 illustrates a process in connection with the aforementioned systems. The process in FIGS. 7-8 can be implemented for example by the systems in FIGS. 1-4 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Turning now to FIG. 7, illustrated is an example method 700 for detecting data in MIMO wireless receivers in accordance with various aspects and embodiments of the subject disclosure.

Method 700 can start at 702 where the method comprises receiving, by a device comprising a processor, a bitstream comprising multiplexed codewords.

At 704 the method comprises performing, by the device, a first decoding pass with a first multiple-input multiple-output detector.

At 708, the method comprises determining, by the device, that a first codeword passes a parity check and a second codeword does not pass the parity check.

At 708, the method comprises performing, by the device, a second decoding pass with a second multiple-input multiple-output detector, wherein the first codeword of the first decoding pass is used as a candidate codeword for the second decoding pass.

Turning now to FIG. 8, illustrated is an example method 800 for detecting data in MIMO wireless receivers in accordance with various aspects and embodiments of the subject disclosure.

Method 800 can start at 802 where the method comprises receiving a bitstream comprising multiplexed codewords, wherein the bitstream is subject to an inter-stream interference.

At 804 the method comprises performing a first pass with respect to the bitstream to reduce the inter-stream interference using a first multiple-input multiple-output detector.

At 806, the method comprises determining, by the device, that a first codeword passes a parity check and a second codeword does not pass the parity check.

At 808 the method comprises performing a second pass with respect to the bitstream to further reduce the inter-stream interference using a second multiple-input multiple-output detector different from the first multiple-input multiple-output detector.

Figure 9:
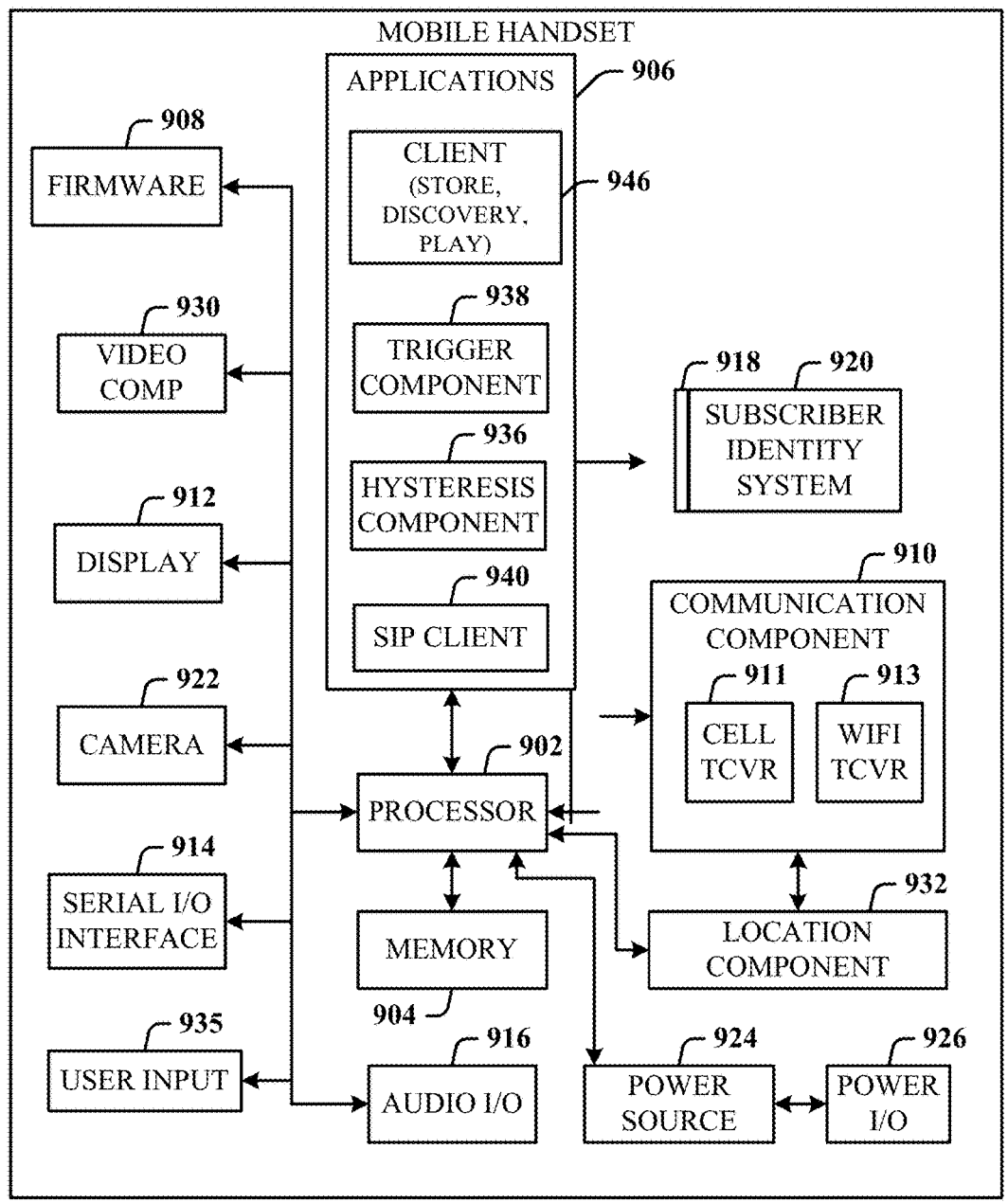
FIG. 9 illustrates an example block diagram of an example user equipment operable to provide an adaptive downlink control channel structure in accordance with various aspects and embodiments of the subject disclosure.

Referring now to FIG. 9, illustrated is a schematic block diagram of an example end-user device such as a user equipment that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description comprises a general context of computer-executable instructions embodied on a machine-readable storage medium, those skilled in the art will recognize that the innovation also can be implemented in combination with other program modules and/or as a combination of hardware and software.

Generally, applications (e.g., program modules) can comprise routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically comprise a variety of machine-readable media. Machine-readable media can be any available media that can be accessed by the computer and comprises both volatile and non-volatile media, removable and non-removable media. By way of example and not limitation, computer-readable media can comprise computer storage media and communication media. Computer storage media can comprise volatile and/or non-volatile media, removable and/or non-removable media implemented in any method or technology for storage of information, such as computer-readable instructions, data structures, program modules or other data. Computer storage media can comprise, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be comprised within the scope of computer-readable media.

The handset 900 comprises a processor 902 for controlling and processing all onboard operations and functions. A memory 904 interfaces to the processor 902 for storage of data and one or more applications 906 (e.g., a video player software, user feedback component software, etc.). Other applications can comprise voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also comprise a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 comprises a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can comprise a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can comprise a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also comprises a power source 924 in the form of batteries and/or an AC power subsystem, which power source 924 can interface to an external power system or charging equipment (not shown) by a power I/O component 926.

The handset 900 can also comprise a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can comprise such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also comprise a client 942 that provides at least the capability of discovery, play and store of multimedia content, for example, music.

The handset 900 can comprise an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
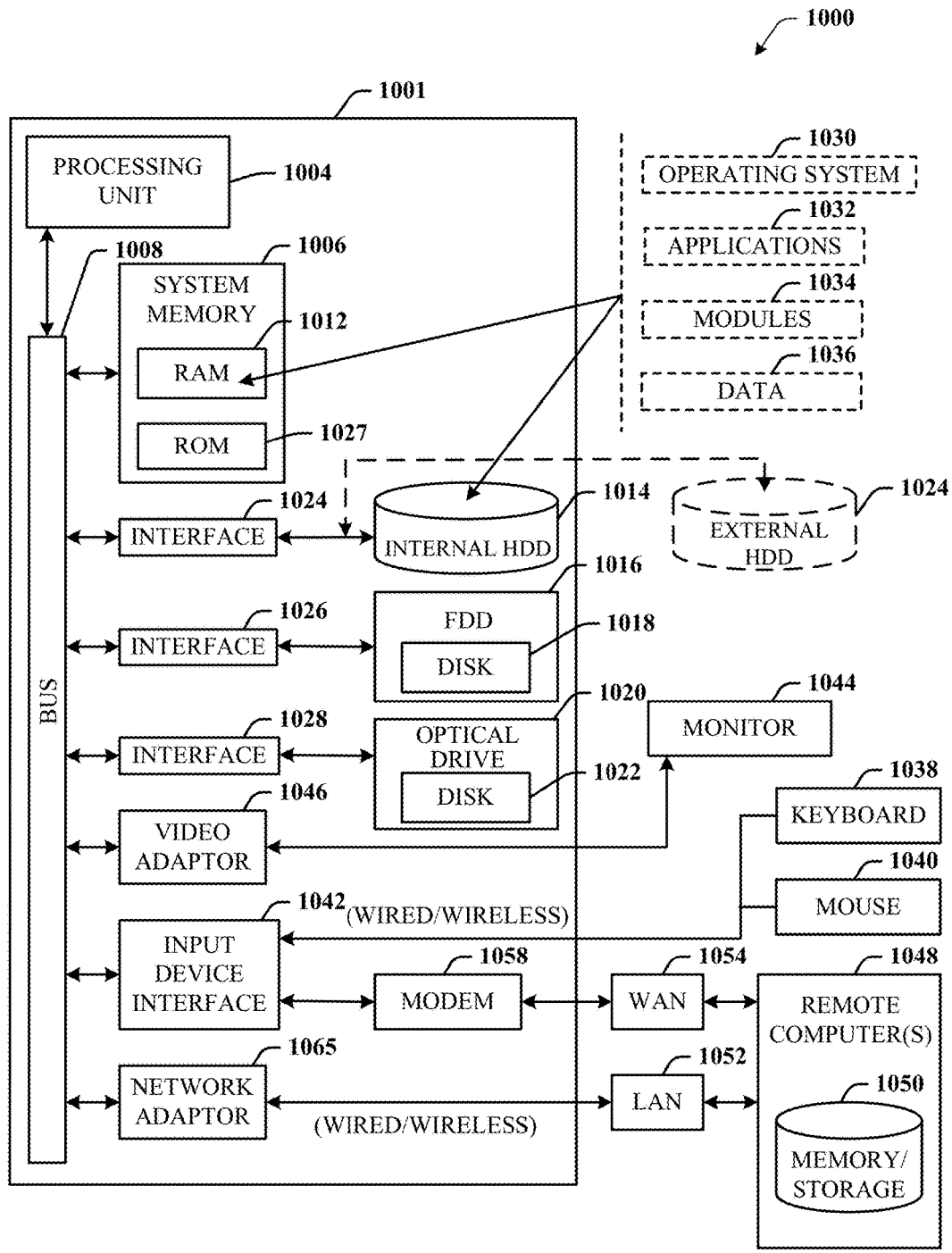
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a network node (e.g., network node 106) may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference to FIG. 10, implementing various aspects described herein with regards to the end-user device can comprise a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 comprises read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also comprise a high-speed RAM such as static RAM for caching data.

The computer 1000 further comprises an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations comprises at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may comprise a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically comprises other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically comprises many or all of the elements described relative to the computer, although, for purposes of brevity, only a memory/storage device 1050 is illustrated. The logical connections depicted comprise wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also comprise a wireless access point disposed thereon for communicating with the wireless adapter 1056.

When used in a WAN networking environment, the computer 1000 can comprise a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "comprises" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
   a processor; and
   a memory that stores executable instructions that, when executed by the processor, facilitate performance of operations, comprising:
      receiving a bitstream comprising multiplexed codewords, wherein the bitstream is subject to an inter-stream interference;
      performing a first pass with respect to the bitstream to reduce the inter-stream interference using a first multiple-input multiple-output detector;
      in response to performing the first pass, determining that a first codeword of the multiplexed codewords passed a parity check and a second codeword of the multiplexed codewords did not pass the parity check;
      generating a bit log-likelihood ratio based on the first codeword, wherein the first codeword is a candidate codeword; and
      performing a second pass with respect to the bitstream to further reduce the inter-stream interference using a second multiple-input multiple-output detector different from the first multiple-input multiple-output detector, wherein the bit log-likelihood ratio is used as an input for the second pass to reduce a data structure size associated with the second pass.

2. The system of claim 1, wherein the first multiple-input multiple-output detector uses filter based detection, and wherein the second multiple-input multiple-output detector uses list based detection.

3. The system of claim 2, wherein the first multiple-input multiple-output detector is at least one of a zero forcing detector, a minimum mean-square error detector, a decision feedback detector, a nulling-canceling detector, or a successive interference cancelation detector.

4. The system of claim 2, wherein the second multiple-input multiple-output detector is at least one of a maximum likelihood detector, a maximum a posteriori probability detector, a sphere decoding detector, or a list sphere decoding detector.

5. The system of claim 1, wherein a first list size associated with the first pass is larger than a second list size associated with the second pass.

6. The system of claim 1, wherein the operations further comprise:
   iteratively performing the first pass and the second pass until all codewords of the multiplexed codewords are correctly decoded.

7. The system of claim 1, wherein the operations further comprise:
   transmitting a negative acknowledgement to a transmitter in response to not having decoded all the multiplexed codewords after a predefined number of iterations has passed.

8. The system of claim 1, wherein the operations further comprise:

transmitting an acknowledgement to a transmitter in response to having decoded all the multiplexed codewords.

9. A method, comprising:
receiving, by a device comprising a processor, a bitstream comprising multiplexed codewords;
performing, by the device, a first decoding pass with a first multiple-input multiple-output detector;
determining, by the device, that a first codeword passes a parity check and a second codeword does not pass the parity check;
generating, by the device, a bit log-likelihood ratio based on the first codeword which is used as a candidate codeword; and
performing, by the device, a second decoding pass with a second multiple-input multiple-output detector, wherein the bit log-likelihood ratio is used as an input for the second decoding pass to reduce a data structure size associated with the second pass.

10. The method of claim 9, wherein the candidate codeword reduces a list size of the second decoding pass relative to the first decoding pass.

11. The method of claim 9, wherein the first multiple-input multiple-output detector uses filter based detection, and wherein the second multiple-input multiple-output detector uses list based detection.

12. The method of claim 9, further comprising:
performing, by the device, iterations of the first decoding pass and the second decoding pass until a predefined number of iterations has passed.

13. The method of claim 12, further comprising:
transmitting, by the device, a negative acknowledgement to a transmitter in response to not decoding all the multiplexed codewords after the predefined number of iterations has passed.

14. A non-transitory machine-readable storage medium, comprising executable instructions that, when executed by a processor of a device, facilitate performance of operations, comprising:
receiving a signal from a multiple-input multiple-output antenna, the signal comprising multiplexed codewords;
performing a first decoding pass on the multiplexed codewords with a first multiple-input multiple-output detector;
determining that a first codeword of the multiplexed codewords passes a parity check and a second codeword of the multiplexed codewords does not pass the parity check;
generating a bit log-likelihood ratio from an output of the first decoding pass; and
performing a second decoding pass with a second multiple-input multiple-output detector to decode the second codeword, wherein the bit log-likelihood ratio is used as an input for the second decoding pass to reduce a data structure size associated with the second decoding pass.

15. The non-transitory machine-readable storage medium of claim 14, wherein the generating the bit log-likelihood ratio further comprises generating the bit log-likelihood ratio based on the first codeword.

16. The non-transitory machine-readable storage medium of claim 14, wherein the operations further comprise:
performing a predefined number of iterations of the first decoding pass and the second decoding pass until all codewords of the multiplexed codewords are correctly decoded or until a predefined number of iterations has passed.

17. The non-transitory machine-readable storage medium of claim 14, wherein the first multiple-input multiple-output detector uses filter based detection, and wherein the second multiple-input multiple-output detector uses list based detection.

18. The non-transitory machine-readable storage medium of claim 14, wherein the first multiple-input multiple-output detector is at least one of a zero forcing detector, a minimum mean-square error detector, a decision feedback detector, a nulling-canceling detector, or a successive interference cancelation detector, and wherein the second multiple-input multiple-output detector is at least one of a maximum likelihood detector, a maximum a posteriori probability detector, a sphere decoding detector, or a list sphere decoding detector.

19. The non-transitory machine-readable storage medium of claim 14, wherein the operations further comprise:
iteratively performing the first decoding pass and the second decoding pass until all codewords of the multiplexed codewords are correctly decoded.

20. The non-transitory machine-readable storage medium of claim 19, wherein the operations further comprise:
transmitting a negative acknowledgement to a transmitter of the signal in response to not having decoded all the multiplexed codewords after a predefined number of iterations has passed.

* * * * *